(12) United States Patent
Park et al.

(10) Patent No.: US 9,713,996 B2
(45) Date of Patent: Jul. 25, 2017

(54) AIRBAG APPARATUS

(71) Applicant: HYUNDAI MOBIS CO., LTD., Seoul (KR)

(72) Inventors: Hae Kwon Park, Yongin-si (KR); Byung Ho Min, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/205,605

(22) Filed: Jul. 8, 2016

(65) Prior Publication Data

US 2017/0043734 A1 Feb. 16, 2017

(30) Foreign Application Priority Data

Aug. 13, 2015 (KR) .................. 10-2015-0114673

(51) Int. Cl.
| | |
|---|---|
| *B60R 19/48* | (2006.01) |
| *B60R 19/20* | (2006.01) |
| *B60R 21/2338* | (2011.01) |
| *B60R 21/233* | (2006.01) |

(52) U.S. Cl.
CPC ............ *B60R 19/48* (2013.01); *B60R 19/205* (2013.01); *B60R 2021/23308* (2013.01); *B60R 2021/23386* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,219,179 A | * | 6/1993 | Eyrainer | B60R 21/239 280/739 |
| 5,492,363 A | * | 2/1996 | Hartmeyer | B60R 21/239 280/738 |
| 6,152,481 A | * | 11/2000 | Webber | B60R 21/232 280/728.2 |
| 6,419,262 B1 | * | 7/2002 | Fendt | B60R 21/231 280/729 |
| 7,828,325 B2 | * | 11/2010 | Pittiglio | B60R 21/239 137/843 |
| 8,500,165 B2 | * | 8/2013 | Kwon | B60R 21/239 280/738 |
| 9,120,458 B2 | * | 9/2015 | Garcia | B60R 21/239 |
| 9,187,055 B1 | * | 11/2015 | Genthikatti | B60R 21/2338 |
| 9,272,684 B1 | * | 3/2016 | Keyser | B60R 21/237 |
| 9,340,176 B2 | * | 5/2016 | Belwafa | B60R 21/233 |
| 9,358,945 B2 | * | 6/2016 | Yamada | B60R 21/233 |
| 9,376,084 B2 | * | 6/2016 | Choi | B60R 21/233 |

(Continued)

FOREIGN PATENT DOCUMENTS

| | | | | |
|---|---|---|---|---|
| KR | 10-1356155 | | 1/2014 | |
| SE | DE 102014003234 A1 | * | 3/2015 | ............ B60R 21/23 |

*Primary Examiner* — Nicole T Verley
(74) *Attorney, Agent, or Firm* — H.C. Park & Associates, PLC (57) ABSTRACT

An airbag apparatus may include: an inflator part installed in a vehicle so as to spray gas; and an airbag cushion part deployed by the gas sprayed by the inflator part. The airbag cushion part may include: a main cushion to which the gas sprayed by the inflator part is introduced; an auxiliary cushion connected to the main cushion and tucked into the main cushion; and an expansion limiting part connecting the main cushion to the tucked-in auxiliary cushion at a preset pressure or less so as to limit expansion of the auxiliary cushion.

11 Claims, 7 Drawing Sheets

(56) References Cited

U.S. PATENT DOCUMENTS

| | | | | |
|---|---|---|---|---|
| 9,463,763 | B2* | 10/2016 | Watamori | B60R 21/23138 |
| 9,499,118 | B2* | 11/2016 | Jindal | B60R 21/231 |
| 9,505,372 | B2* | 11/2016 | Yamada | B60R 21/2338 |
| 9,533,652 | B1* | 1/2017 | Paxton | B60R 21/239 |
| 9,550,469 | B2* | 1/2017 | Sato | B60R 21/231 |
| 9,555,762 | B2* | 1/2017 | Umehara | B60R 21/233 |
| 9,561,774 | B2* | 2/2017 | Cheng | B60R 21/203 |
| 2002/0125692 | A1* | 9/2002 | Brannon | B60R 21/232 280/730.2 |
| 2003/0214121 | A1* | 11/2003 | Miyata | B60R 21/231 280/730.1 |
| 2003/0218325 | A1* | 11/2003 | Hasebe | B60R 21/233 280/743.2 |
| 2004/0145161 | A1* | 7/2004 | Hasebe | B60R 21/233 280/729 |
| 2005/0206143 | A1* | 9/2005 | Webber | B60R 21/2338 280/736 |
| 2006/0151228 | A1* | 7/2006 | Kalliske | B60R 21/2338 180/274 |
| 2006/0192370 | A1* | 8/2006 | Abe | B60R 21/0132 280/735 |
| 2007/0246922 | A1* | 10/2007 | Manssart | B60R 21/239 280/739 |
| 2008/0048420 | A1* | 2/2008 | Washino | B60R 21/203 280/731 |
| 2008/0073893 | A1* | 3/2008 | Schneider | B60R 21/2338 280/740 |
| 2008/0122205 | A1* | 5/2008 | Imamura | B60R 21/203 280/730.1 |
| 2008/0203710 | A1* | 8/2008 | Kalliske | B60R 21/233 280/729 |
| 2010/0059972 | A1* | 3/2010 | Kim | B60R 21/0136 280/728.2 |
| 2011/0309605 | A1* | 12/2011 | Kumagai | B60R 21/2338 280/741 |
| 2012/0193897 | A1* | 8/2012 | Ruedisueli | B60R 21/21 280/730.2 |
| 2012/0223550 | A1* | 9/2012 | Mazanek | B60R 21/207 297/216.1 |
| 2013/0001934 | A1* | 1/2013 | Nagasawa | B60R 21/233 280/731 |
| 2013/0147171 | A1* | 6/2013 | Shin | B60R 21/2338 280/743.2 |
| 2013/0200603 | A1* | 8/2013 | Bergenheim | B60R 21/36 280/762 |
| 2013/0234422 | A1* | 9/2013 | Wipasuramonton | B60R 21/232 280/730.2 |
| 2014/0008902 | A1* | 1/2014 | Schneider | B60R 21/2338 280/741 |
| 2014/0042732 | A1* | 2/2014 | Taguchi | B60R 21/233 280/729 |
| 2014/0333053 | A1* | 11/2014 | Thomas | B60R 21/2338 280/743.2 |
| 2015/0158452 | A1* | 6/2015 | Choi | B60R 21/233 280/732 |
| 2015/0166002 | A1* | 6/2015 | Fukawatase | B60R 21/233 280/730.1 |
| 2015/0258959 | A1* | 9/2015 | Belwafa | B60R 21/233 280/729 |
| 2015/0283971 | A1* | 10/2015 | Fischer | B60R 21/2338 280/742 |
| 2015/0298643 | A1* | 10/2015 | Schneider | B60R 21/233 280/729 |
| 2015/0307056 | A1* | 10/2015 | Cheng | B60R 21/231 280/729 |
| 2015/0321636 | A1* | 11/2015 | Jang | B60R 21/233 280/743.2 |
| 2015/0367802 | A1* | 12/2015 | Fukawatase | B60R 21/205 280/732 |
| 2016/0039385 | A1* | 2/2016 | Watamori | B60R 21/23138 280/730.1 |
| 2016/0046254 | A1* | 2/2016 | Yamada | B60R 21/233 280/729 |
| 2016/0046257 | A1* | 2/2016 | Yamada | B60R 21/2338 280/729 |
| 2016/0059817 | A1* | 3/2016 | Umehara | B60R 21/233 280/729 |
| 2016/0068131 | A1* | 3/2016 | Komatsu | B60R 21/233 280/730.1 |
| 2016/0096503 | A1* | 4/2016 | Lee | B60R 21/231 280/743.2 |
| 2016/0144820 | A1* | 5/2016 | Shin | B60R 21/239 280/735 |
| 2016/0159311 | A1* | 6/2016 | Yamada | B60R 21/233 280/729 |
| 2016/0159312 | A1* | 6/2016 | Sato | B60R 21/233 280/729 |
| 2016/0207490 | A1* | 7/2016 | Yamada | B60R 21/2338 |
| 2016/0311392 | A1* | 10/2016 | Jindal | B60R 21/231 |
| 2016/0339866 | A1* | 11/2016 | Pieruch | B60R 21/233 |
| 2016/0355152 | A1* | 12/2016 | Perez Garcia | B60R 21/233 |
| 2017/0015270 | A1* | 1/2017 | Ohno | B60R 21/233 |
| 2017/0021794 | A1* | 1/2017 | Sumiya | B60R 21/233 |
| 2017/0036639 | A1* | 2/2017 | Yamada | B60R 21/233 |

* cited by examiner

FIG. 7

AIRBAG APPARATUS

CROSS-REFERENCES TO RELATED APPLICATIONS

The present application claims priority to Korean application number 10-2015-0114673, filed on Aug. 13, 2015, which is incorporated by reference in its entirety.

BACKGROUND OF THE INVENTION

The present invention relates to an airbag apparatus, and more particularly, to an airbag apparatus which is capable of adjusting the internal pressure of a main cushion mounted in a vehicle, thereby preventing damage of the main cushion.

In general, an airbag apparatus refers to an apparatus which absorbs an impact which is generated during a vehicle collision. The airbag apparatus expands and deploys a main cushion using an expansion force of gas jetted from an inflator part.

In particular, an external airbag apparatus deploys a main cushion to the front of a vehicle before the vehicle collides with an obstacle, and absorbs and buffers an impact caused by the collision with the obstacle.

In the conventional external airbag apparatus, when the main cushion collides with an obstacle, the main cushion may be damaged while the internal pressure of the main cushion is rapidly increased. Thus, there is a demand for a structure capable of solving such a problem.

The related art of the present invention is disclosed in Korean Patent Laid-open Publication No. 10-1356155 published on Jan. 20, 2014 and entitled "Apparatus for spread air bag exterior of vehicle".

SUMMARY OF THE INVENTION

Embodiments of the present invention are directed to an airbag apparatus which is capable of preventing the damage of a main cushion, which may occur due to a rapid increase in internal pressure of the main cushion when the main cushion collides, and stably absorbing an impact force which is generated during a collision with an obstacle.

In one embodiment, an airbag apparatus may include: an inflator part installed in a vehicle so as to spray gas; and an airbag cushion part deployed by the gas sprayed by the inflator part. The airbag cushion part may include: a main cushion to which the gas sprayed by the inflator part is introduced; an auxiliary cushion connected to the main cushion and tucked into the main cushion; and an expansion limiting part connecting the main cushion to the tucked-in auxiliary cushion at a preset pressure or less so as to limit expansion of the auxiliary cushion.

The main cushion may be divided into a plurality of chambers by a separator, and the separator may have holes through which gas is moved between the respective chambers.

When the expansion limitation by the expansion limiting part is released, the auxiliary cushion may be expanded by the gas sprayed from the inflator part, and protrude to the outside of the main cushion.

The airbag cushion part may include a pair of auxiliary cushions coupled to both ends of the main cushion.

The auxiliary cushion may be integrated with the main cushion.

The expansion limiting part may include a tether which is sewed and connected to the main cushion and the auxiliary cushion.

When the internal pressure of the main cushion exceeds the preset pressure, the connection between the expansion limiting part and the main cushion or the auxiliary cushion may be removed to allow expansion of the auxiliary cushion.

The auxiliary cushion may have a vent hole through which the gas contained in the auxiliary cushion is discharged.

The airbag cushion part may further include a variable hole part coupled to the auxiliary cushion and adjusting the opening degree of the vent hole according to the internal pressure of the auxiliary cushion.

The variable hole part may be coupled to the auxiliary cushion so as to cover the vent hole, and have a variable vent hole formed therethrough, the variable vent hole having a smaller diameter than the vent hole.

The airbag cushion part may include a plurality of variable hole parts which are sequentially coupled, and each of the variable hole parts may have a small diameter as the variable hole part is coupled at low priority.

When the internal pressure of the auxiliary cushion rises to the preset pressure or more, the couplings between the plurality of variable hole parts and the auxiliary cushion or the neighboring variable hole part may be removed to increase to the opening degrees of the vent holes.

The vent hole and the variable hole part may form a concentric circle.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
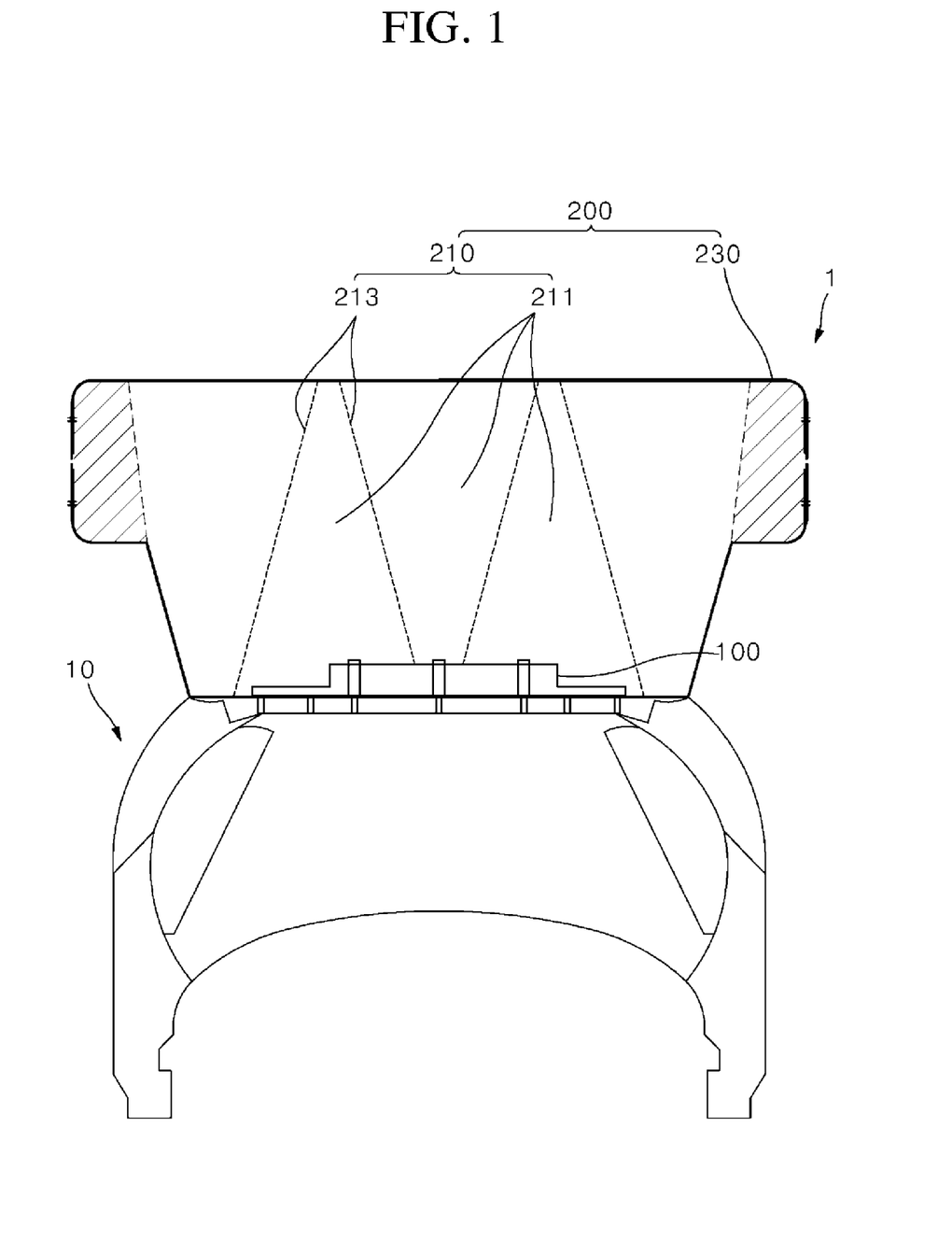
FIG. 1 schematically illustrates a state in which an airbag apparatus mounted in a vehicle in accordance with an embodiment of the present invention is deployed.

FIG. 1 schematically illustrates a state in which an airbag apparatus mounted in a vehicle in accordance with an embodiment of the present invention is deployed. Referring to FIG. 1, the airbag apparatus 1 in accordance with the embodiment of the present invention may be mounted in a bumper (not illustrated) of the vehicle 10, in order to absorb an impact force which is generated during an emergency such as a collision of the vehicle 10, and include an inflator part 100 and an airbag cushion part 200.

The inflator part 100 may be installed in the vehicle 10 so as to spray gas into the airbag cushion part 200. In the present embodiment, the inflator part 100 may be mounted in the bumper of the vehicle. During an emergency such as a collision of the vehicle 10, the inflator part 100 may be controlled by a control unit (not illustrated), and expand and deploy the airbag cushion part 200 by spraying gas into the airbag cushion part 200.

The airbag cushion part 200 may be deployed by the gas sprayed by the inflator part 100. In the present embodiment, the airbag cushion part 200 may include a main cushion 210, an auxiliary cushion 230 and an expansion limiting part 250.

The main cushion 210 may be expanded and deployed when the gas sprayed from the inflator part 100 is introduced into the main cushion 210, and absorb and buffer an impact force while being compressively deformed by an external impact.

In the present embodiment, the inside of the main cushion 210 may be divided into a plurality of chambers 211 by a separator 213. Thus, the deformation of the main cushion 210 may be limited by the separator 213. Therefore, when the main cushion 210 is compressed by an impact, excessive deformation of the main cushion 210 can be prevented while the performance of the main cushion 210 to absorb an impact force during a collision is secured.

Furthermore, the separator 213 may have holes through which gas can be moved between the respective chambers 211. Thus, the damage of the main cushion 210 may be prevented even though the pressure of a specific chamber 211 is rapidly increased.

Figure 2:
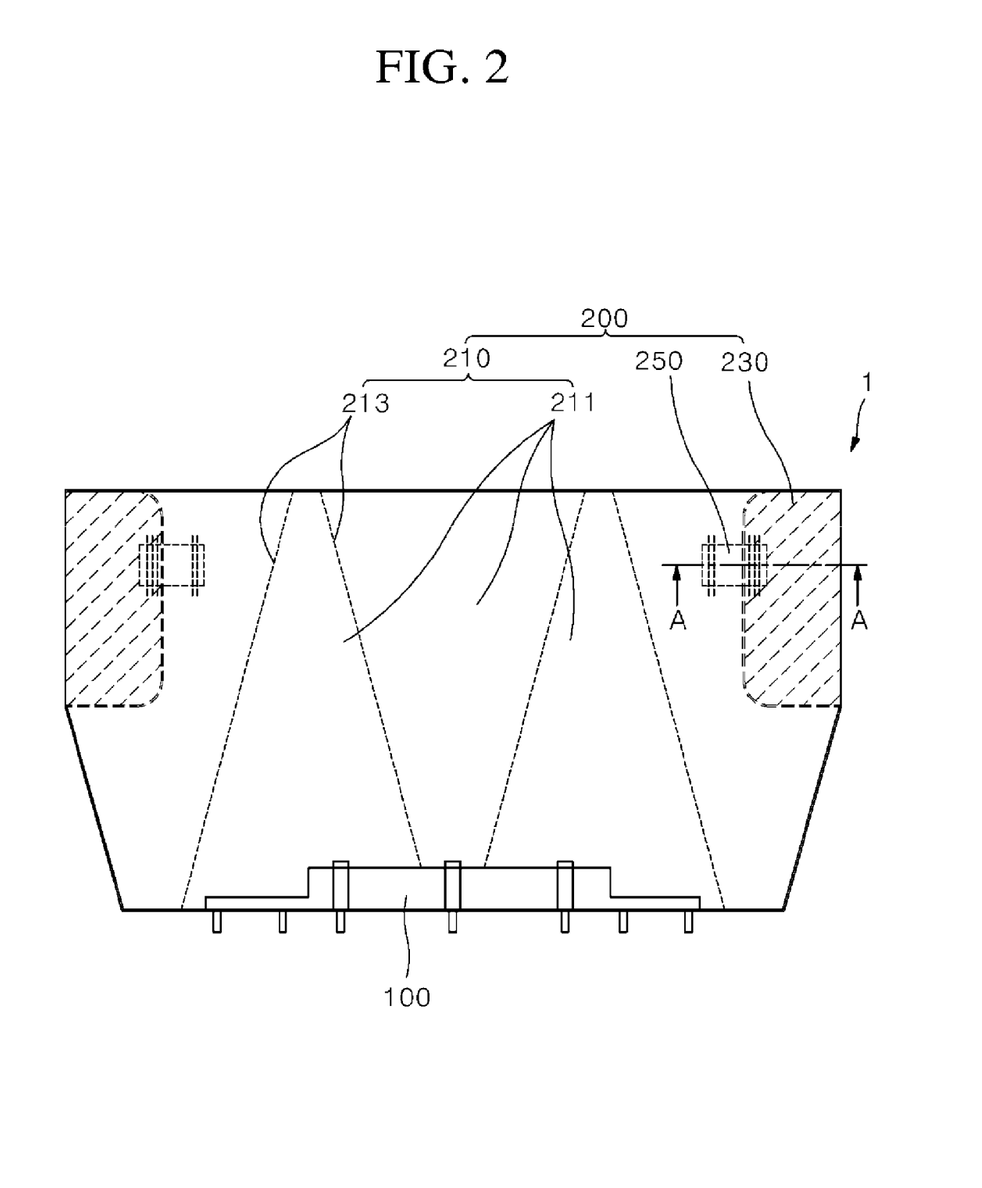
FIG. 2 is a plan view illustrating a state in which an auxiliary cushion is tucked into a main cushion in the airbag apparatus in accordance with the embodiment of the present invention.
Figure 3:
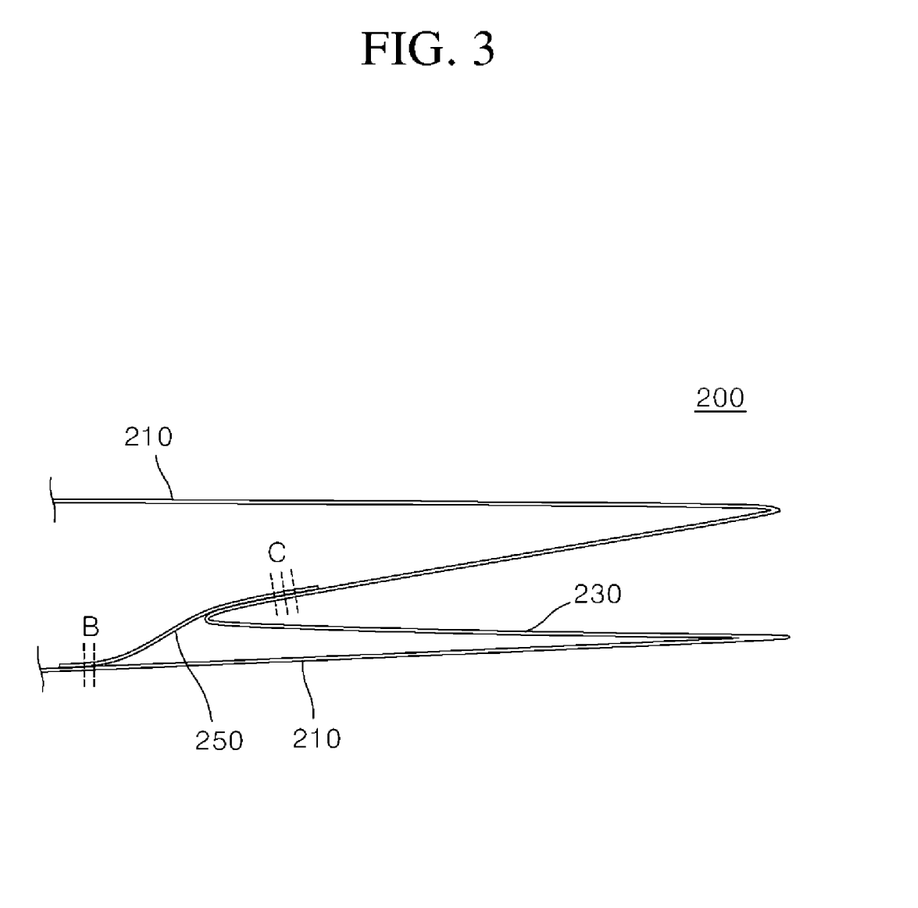
FIG. 3 is a cross-sectional view taken along the line A-A' of FIG. 2.

FIG. 2 is a plan view illustrating a state in which the auxiliary cushion is tucked into the main cushion in the airbag apparatus in accordance with the embodiment of the present invention, and FIG. 3 is a cross-sectional view taken along the line A-A' of FIG. 2.

Referring to FIGS. 2 and 3, the auxiliary cushion 230 may be connected to the main cushion 210, and tucked into the main cushion 210.

In the present embodiment, when the internal pressure of the main cushion 210 is equal to or less than preset pressure, the auxiliary cushion 230 may maintain the state in which the auxiliary cushion 230 is tucked into the main cushion 210, thereby limiting the internal space of the main cushion 210. Thus, the main cushion 210 can be rapidly expanded and deployed.

Furthermore, when the main cushion 210 is deployed or the internal pressure of the main cushion 210 exceeds the preset pressure due to a collision with an obstacle, the auxiliary cushion 230 may be expanded to protrude to the outside of the main cushion 210. Thus, the auxiliary cushion 230 may receive and discharge the gas introduced into the main cushion 210, thereby adjusting the internal pressure of the main cushion 210.

In the present embodiment, the airbag apparatus may include a pair of auxiliary cushions 230 coupled to both ends of the main cushion 210 (left and right ends of FIG. 2), respectively. Thus, when the internal pressure of the main cushion 210 is increased, the pair of auxiliary cushions 230 may receive the gas of the main cushion 210 at the same time, and discharge a part of the gas so as to rapidly adjust the internal pressure of the main cushion 210.

In the present embodiment, the auxiliary cushions 230 may be connected to the main cushion 210 while communicating with the main cushion 210. Furthermore, since the auxiliary cushions 230 are integrated with the main cushion 210, the number of manufacturing processes can be reduced while the durability is improved.

In the present embodiment, when the auxiliary cushions 230 are integrated with the main cushion 210, the airbag cushion part 200 including the main cushion 210 and the auxiliary cushions 230 may be manufactured through a simple process of manufacturing one cushion including the auxiliary cushions 230 and the main cushion 210 and tucking in a part of the cushion.

Figure 4:
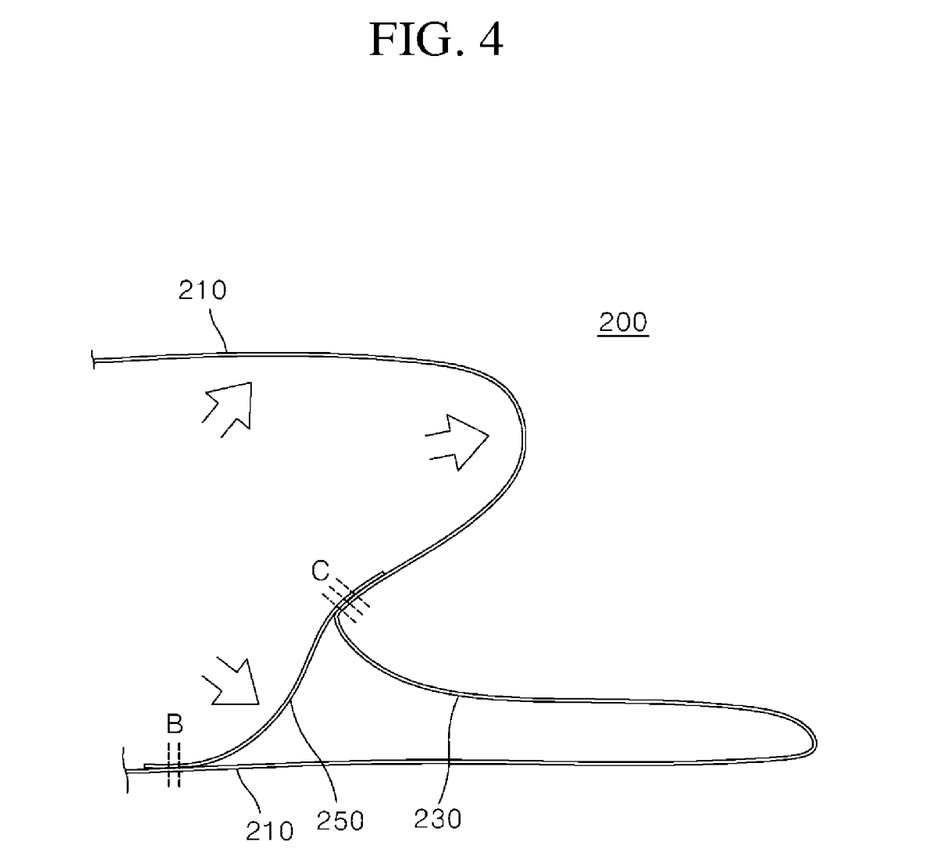
FIG. 4 is a diagram illustrating a state where the main cushion is expanded in FIG. 3.
Figure 5:
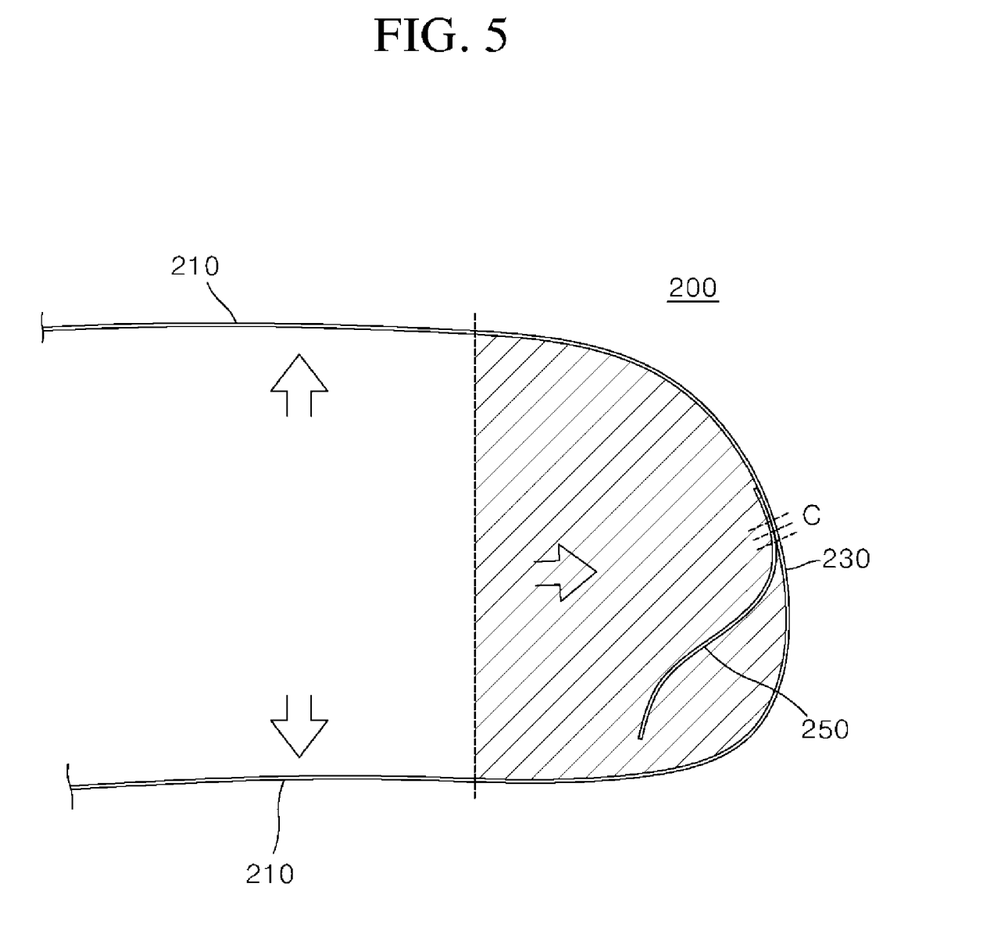
FIG. 5 is a diagram illustrating a state where the main cushion and the auxiliary cushion are expanded in FIG. 3.

FIG. 4 is a diagram illustrating a state where the main cushion is expanded in FIG. 3, and FIG. 5 is a diagram illustrating a state where the main cushion and the auxiliary cushion are expanded in FIG. 3.

Referring to FIGS. 3 to 5, the expansion limiting part 250 may connect the main cushion 210 to the tucked-in auxiliary cushion 230 when the internal pressure of the main cushion 210 is equal to or less than a preset pressure, thereby limiting the expansion of the auxiliary cushion 230.

In the present embodiment, the expansion limiting part 250 may include a tether which is sewed and connected to the main cushion 210 and the auxiliary cushion 230 and limits the expansion of the tucked-in auxiliary cushion 230.

When the internal pressure of the main cushion 210 exceeds the preset pressure, the connection between the expansion limiting part 250 and the main cushion 210 or the auxiliary cushion 230 may be removed to allow the expansion of the auxiliary cushion 230.

In the present embodiment, the auxiliary cushion 230 may have a vent hole 233 to discharge the gas contained in the auxiliary cushion 230. That is, the gas transferred to the auxiliary cushion 230 from the main cushion 210 may expand the auxiliary cushion 230, and a part of the gas having expanded the auxiliary cushion 230 may be discharged through the vent hole 233, thereby adjusting the internal pressure of the auxiliary cushion 230 while preventing the damage of the auxiliary cushion 230.

In the present embodiment, the airbag apparatus 1 may further include a variable hole part 300. The variable hole part 300 may be coupled to the auxiliary cushion 230, and adjust the opening degree of the vent hole 233 formed in the auxiliary cushion 230 according to the internal pressure of the auxiliary cushion 230.

In the present embodiment, the variable hole part 300 may be coupled to the auxiliary cushion 230 so as to cover the vent hole 233, and have a variable vent hole 310 formed therethrough, the variable vent hole 310 having a smaller diameter than the diameter of the vent hole 233.

Thus, when the internal pressure of the auxiliary cushion 230 is smaller than a preset pressure, gas may be discharged through the variable vent hole 310 having a smaller diameter than the diameter of the vent hole 233, such that the auxiliary cushion 230 can be rapidly expanded.

However, when the internal pressure of the auxiliary cushion 230 is equal to or more than the preset pressure, the variable hole part 300 may be removed by the expansion pressure, and gas may be discharged through the vent hole 233. Since the vent hole 233 has a larger diameter than the variable vent hole 310, the vent hole 233 may rapidly discharge the gas contained in the auxiliary cushion 230, thereby preventing the damage of the auxiliary cushion 230 which may occur due to a rapid pressure increase.

In the present embodiment, the airbag apparatus 1 may include a plurality of variable hole parts 300 which are sequentially connected. As each of the variable hole parts 300 is connected at low priority, the variable hole part 300 may have a small diameter. Thus, according to the extent that the internal pressure of the auxiliary cushion 230 is increased, the diameters of the variable vent holes 310 may be expanded while the connections of the variable hole parts 300 are sequentially removed from the outermost variable hole part 300 which is connected at low priority. Thus, the opening degrees of the vent holes 233 may be differently set in a plurality of pressure sections.

Thus, when the internal pressure of the auxiliary cushion 230 rises to the preset pressure or more, the couplings between the variable hole parts 300 and the auxiliary cushion 230 or the neighboring variable hole part 300 may be released to increase the opening degrees of the vent holes 233.

In the present embodiment, the vent hole 233 and the variable vent hole 310 may be positioned to form a concentric circle. Thus, the gas can be easily discharged through the vent hole 233, and the expansion force applied to the variable hole part 300 may be uniformly applied across the variable hole part 300, which makes it possible to prevent the variable hole part 300 from being removed at the preset pressure or less.

Figure 6:
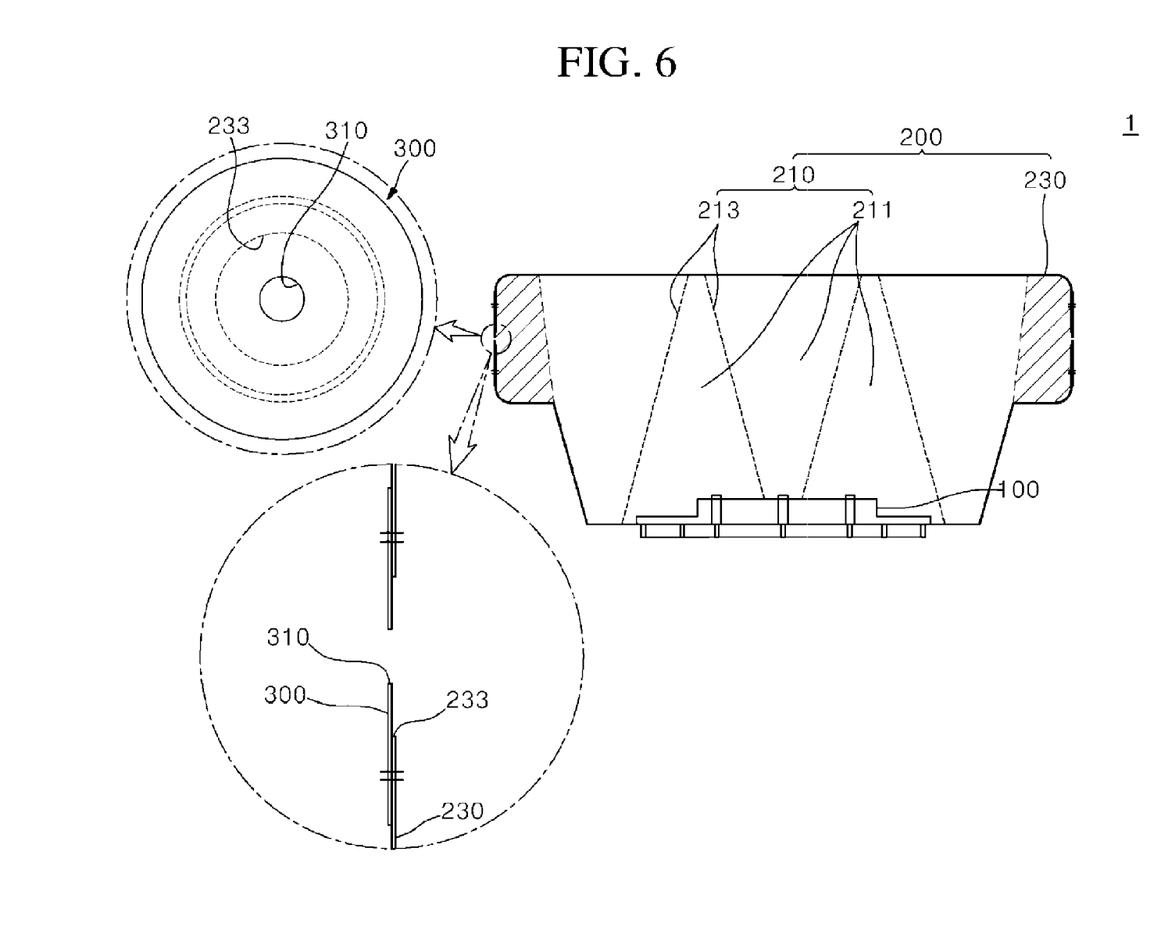
FIG. 6 is a plan view illustrating a state where the airbag apparatus in accordance with the embodiment of the present invention is deployed.
Figure 7:
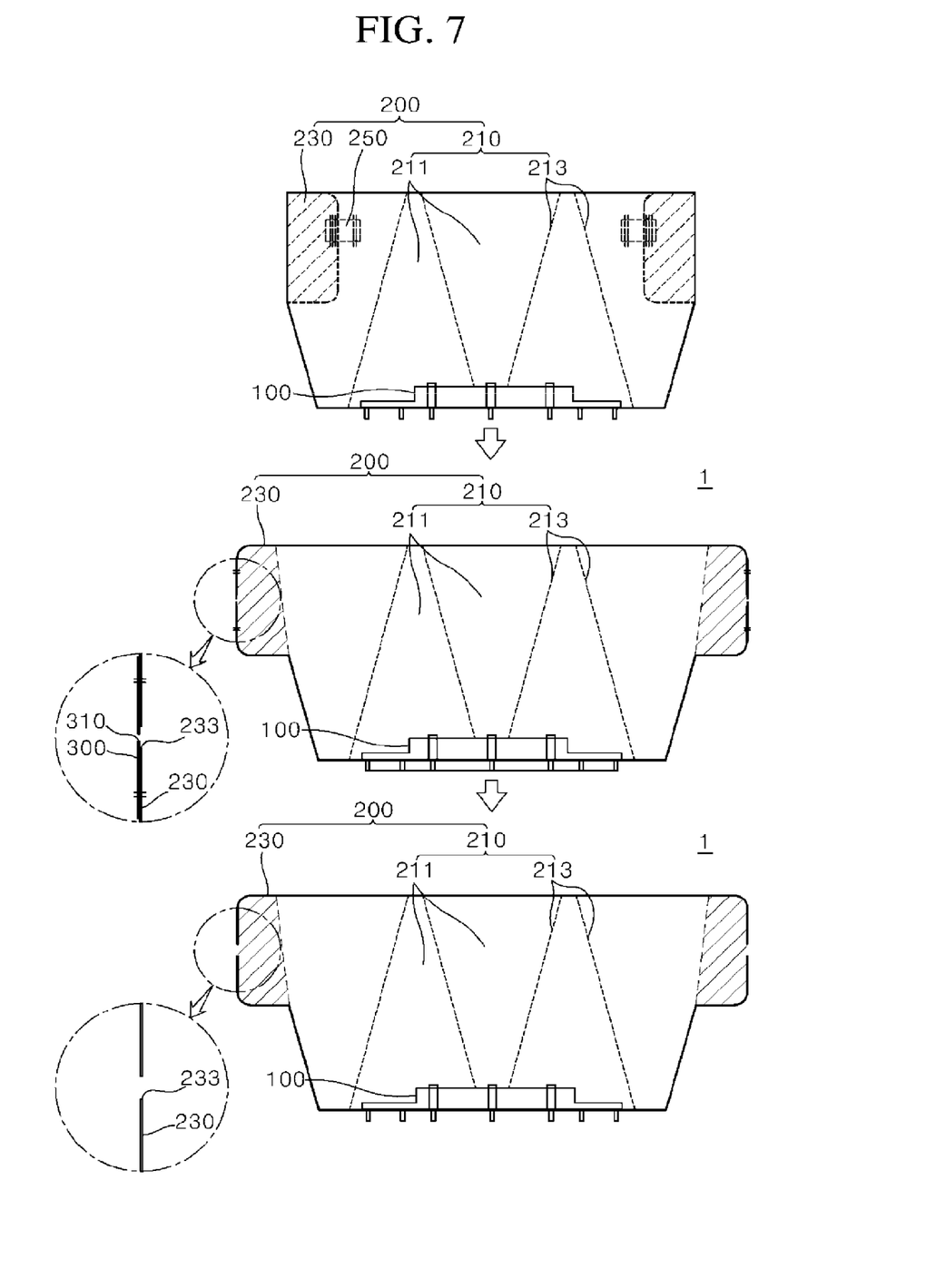
FIG. 7 is a diagram illustrating the sequence in which the airbag apparatus in accordance with the embodiment of the present invention is deployed.

FIG. 6 is a plan view illustrating a state where the airbag apparatus in accordance with the embodiment of the present invention is deployed, and FIG. 7 is a diagram illustrating the sequence in which the airbag apparatus in accordance with the embodiment of the present invention is deployed.

Referring to FIGS. 1, 6, and 7, the operation principle and effect of the airbag apparatus 1 in accordance with the embodiment of the present invention will be described as follow.

When the vehicle 10 collides with an obstacle, the inflator part 100 may spray gas into the main cushion 210 according to control of the control unit. The gas introduced into the main cushion 210 may expand and deploy the respective chambers 211.

When the main cushion 210 collides with an obstacle, or particularly when the main cushion 210 collides at high speed, the internal pressure of the main cushion 210 may be rapidly increased. According to the pressure increase, the expansion of the main cushion 210 may remove the connection between the expansion limiting part 250 and the main cushion 210 or the expansion limiting part 250 and the auxiliary cushion 230.

When the expansion limitation by the expansion limiting part 250 is released, the auxiliary cushion 230 may be expanded and deployed to receive the gas contained in the main cushion 210. Then, the auxiliary cushion 230 may discharge a part of the gas to reduce the internal pressure of the main cushion 210.

Furthermore, while the gas is discharged through the vent hole 233 and the variable hole part 300 which are formed in the auxiliary cushion 230, the internal pressure of the auxiliary cushion 230 and the main cushion 210 may be adjusted.

In particular, since the variable hole part 300 can adjust the opening degree of the vent hole 233 while being separated from the auxiliary cushion 230 or the neighboring variable hole part 300 according to the internal pressure of the auxiliary cushion 230, the damage of the main cushion 210 and the auxiliary cushion 230 can be prevented while the expansion and impact absorption performance of the main cushion 210 are maintained.

Thus, in the airbag apparatus 1 in accordance with the embodiment of the present invention, the auxiliary cushion 230 tucked into the main cushion 210 may be expanded to adjust the internal pressure of the main cushion 210, thereby preventing a rapid increase in internal pressure of the main cushion 210.

Therefore, when the vehicle 10 collides with an obstacle, the airbag apparatus 1 in accordance with the present embodiment can prevent the damage of the main cushion 210, thereby stably absorbing an impact force which is generated during the collision.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag apparatus comprising:
   an inflator part installed in a vehicle so as to spray gas; and
   an airbag cushion part deployed by the gas sprayed by the inflator part,
   wherein the airbag cushion part comprises:
      a main cushion to which the gas sprayed by the inflator part is introduced;
      an auxiliary cushion connected to the main cushion and tucked into the main cushion;
      an expansion limiting part connecting the main cushion to the tucked-in auxiliary cushion at a preset pressure or less so as to limit expansion of the auxiliary cushion; and
      sequentially coupled variable hole parts;
   wherein the auxiliary cushion has a vent hole through which the gas contained in the auxiliary cushion is discharged; and
   wherein when the internal pressure of the auxiliary cushion rises above the preset pressure, the couplings between the plurality of variable hole parts and the auxiliary cushion or the neighboring variable hole part are removed to increase the opening degree of the vent hole.

2. The airbag apparatus of claim 1, wherein the main cushion is divided into a plurality of chambers by a separator, and the separator has holes through which gas is moved between the respective chambers.

3. The airbag apparatus of claim 1, wherein when the expansion limitation by the expansion limiting part is released, the auxiliary cushion is expanded by the gas sprayed from the inflator part, and protrudes to the outside of the main cushion.

4. The airbag apparatus of claim 3, wherein the airbag cushion part comprises a pair of auxiliary cushions coupled to both ends of the main cushion.

5. The airbag apparatus of claim 3, wherein the auxiliary cushion is integrated with the main cushion.

6. The airbag apparatus of claim 3, wherein the expansion limiting part comprises a tether which is sewed and connected to the main cushion and the auxiliary cushion.

7. The airbag apparatus of claim 6, wherein when the internal pressure of the main cushion exceeds the preset pressure, the connection between the expansion limiting part and the main cushion or the auxiliary cushion is removed to allow expansion of the auxiliary cushion.

8. The airbag apparatus of claim 1, wherein the airbag cushion part further comprises a variable hole part coupled to the auxiliary cushion and adjusting the opening degree of the vent hole according to the internal pressure of the auxiliary cushion.

9. The airbag apparatus of claim 8, wherein the variable hole part is coupled to the auxiliary cushion so as to cover the vent hole, and has a variable vent hole formed therethrough, the variable vent hole having a smaller diameter than the vent hole.

10. The airbag apparatus of claim 9, wherein each of the adjacent variable hole parts has a decreasing diameter.

11. The airbag apparatus of claim 10, wherein the vent hole and the variable hole part form a concentric circle.

\* \* \* \* \*